United States Patent
Satake et al.

(10) Patent No.: US 9,574,324 B2
(45) Date of Patent: Feb. 21, 2017

(54) WORK MACHINE

(75) Inventors: Hidetoshi Satake, Ishioka (JP); Takako Satake, legal representative, Ishioka (JP); Manabu Edamura, Kasumigaura (JP); Takatoshi Ooki, Kasumigaura (JP); Shinji Nishikawa, Kasumigaura (JP); Kouichi Shibata, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 597 days.

(21) Appl. No.: 14/115,972

(22) PCT Filed: May 10, 2012

(86) PCT No.: PCT/JP2012/061987
§ 371 (c)(1),
(2), (4) Date: Jan. 6, 2014

(87) PCT Pub. No.: WO2012/157510
PCT Pub. Date: Nov. 22, 2012

(65) Prior Publication Data
US 2014/0165548 A1 Jun. 19, 2014

(30) Foreign Application Priority Data
May 18, 2011 (JP) .................. 2011-111869

(51) Int. Cl.
E02F 9/20 (2006.01)
E02F 9/12 (2006.01)
(Continued)

(52) U.S. Cl.
CPC .............. *E02F 9/123* (2013.01); *B60K 6/46* (2013.01); *B60K 17/10* (2013.01); *B60K 25/00* (2013.01);
(Continued)

(58) Field of Classification Search
CPC ......... E02F 9/2075; E02F 9/123; B60K 17/10; B60K 17/105; B60K 17/14
(Continued)

(56) References Cited

U.S. PATENT DOCUMENTS 5,201,177 A * 4/1993 Kim ................. E02F 3/438
60/426
5,848,531 A * 12/1998 Nakamura ........... E02F 9/2228
60/426
(Continued)

FOREIGN PATENT DOCUMENTS

EP 2573281 A1 3/2013
JP 2014-124381 A 4/2004
(Continued)

OTHER PUBLICATIONS

Extended European Search Report received in corresponding European Application No. 12785881.9 dated Jun. 25, 2015.
(Continued)

*Primary Examiner* — Michael Leslie
*Assistant Examiner* — Dustin T Nguyen
(74) *Attorney, Agent, or Firm* — Mattingly & Malur, PC

(57) ABSTRACT

A work machine includes a swing hydraulic motor and a swing electric motor for driving an upper swing structure. A capacitor supplies electricity to the swing electric motor and an operating device outputs through one operation, an operating signal for concurrently operating the swing hydraulic motor and the swing electric motor. A main controller switches between a hydraulic-alone drive mode and an electric-alone drive mode, the hydraulic-alone drive mode being a mode to drive only the swing hydraulic motor selected from the swing hydraulic motor and the swing electric motor when the operating device is operated, the electric-alone drive mode being a mode to drive only the swing electric motor selected from the swing hydraulic motor and the swing electric motor when the operating is operated. Therefore, the actuator that malfunctions can easily be specified among the plurality of mounted actuators.

9 Claims, 9 Drawing Sheets

(51) Int. Cl.
*B60K 6/46* (2007.10)
*B60K 17/10* (2006.01)
*B60L 11/12* (2006.01)
*E02F 9/22* (2006.01)
*B60K 25/00* (2006.01)
*B60K 25/04* (2006.01)
*B60L 1/00* (2006.01)
*B60L 11/00* (2006.01)
*E02F 9/26* (2006.01)
*B60K 7/00* (2006.01)
*B60K 1/04* (2006.01)

(52) U.S. Cl.
CPC ............... *B60K 25/04* (2013.01); *B60L 1/003* (2013.01); *B60L 11/005* (2013.01); *B60L 11/12* (2013.01); *E02F 9/2075* (2013.01); *E02F 9/2095* (2013.01); *E02F 9/226* (2013.01); *E02F 9/2296* (2013.01); *E02F 9/267* (2013.01); *B60K 7/0015* (2013.01); *B60K 2001/0416* (2013.01); *B60L 2200/40* (2013.01); *B60L 2250/16* (2013.01); *B60Y 2200/41* (2013.01); *B60Y 2200/412* (2013.01); *B60Y 2200/415* (2013.01); *Y02T 10/6217* (2013.01); *Y02T 10/7022* (2013.01); *Y02T 10/7077* (2013.01)

(58) Field of Classification Search
USPC .......... 60/719, 698, 422; 180/305, 306, 307, 180/308; 414/930; 701/50
See application file for complete search history.

(56) References Cited

U.S. PATENT DOCUMENTS

| | | | | |
|---|---|---|---|---|
| 6,078,855 A * | 6/2000 | Kinugawa | ................. | E02F 9/22 60/431 |
| 6,199,307 B1 * | 3/2001 | Kagoshima | ............ | E02F 3/325 37/443 |
| 6,308,516 B1 * | 10/2001 | Kamada | ................ | E02F 9/2228 60/450 |
| 8,783,025 B2 * | 7/2014 | Hindman | ................ | F15B 11/17 60/327 |
| 8,959,918 B2 * | 2/2015 | Nishikawa | ............. | E02F 9/123 180/65.21 |
| 2004/0093139 A1 * | 5/2004 | Wildey | ................... | B62D 12/00 701/41 |
| 2004/0128966 A1 * | 7/2004 | Kempf | ................ | F16H 61/0213 56/10.8 |
| 2005/0256631 A1 * | 11/2005 | Cawthorne | .............. | B60K 6/40 701/99 |
| 2007/0216331 A1 * | 9/2007 | Morinaga | ............... | E02F 9/123 318/561 |
| 2008/0093152 A1 * | 4/2008 | Gray | ........................ | B60K 6/12 180/307 |
| 2008/0093865 A1 * | 4/2008 | Komiyama | .............. | B60K 6/48 290/40 A |
| 2008/0202468 A1 * | 8/2008 | Grill | ..................... | E02F 9/2235 123/339.14 |
| 2008/0317574 A1 * | 12/2008 | Moriya | ................... | E02F 9/128 414/687 |
| 2010/0031650 A1 * | 2/2010 | Morinaga | ............... | B60L 1/003 60/459 |
| 2010/0071358 A1 * | 3/2010 | Ueda | ..................... | E02F 9/2242 60/420 |
| 2010/0097040 A1 * | 4/2010 | Boisvert | ................. | F15B 7/008 322/40 |
| 2010/0161175 A1 * | 6/2010 | Yamada | .................... | E02F 9/26 701/33.4 |
| 2010/0162706 A1 * | 7/2010 | Sakai | ....................... | E02F 3/325 60/706 |

FOREIGN PATENT DOCUMENTS

| | | |
|---|---|---|
| JP | 2004-360216 A | 12/2004 |
| JP | 2005-290882 A | 10/2005 |
| JP | 2008-297754 A | 12/2008 |

OTHER PUBLICATIONS

International Preliminary Report on Patentability received in International Application No. PCT/JP2012/061987 dated Nov. 28, 2013.

* cited by examiner

| DETECTION RESULTS | | |
|---|---|---|
| | SENSOR VALUE | REFERENCE VALUE |
| DIFFERENTIAL PRESSURE [MPa] | +○○ | Cp1-Cp2 |
| CURRENT [A] | +×× | Ci1-Ci2 |

44

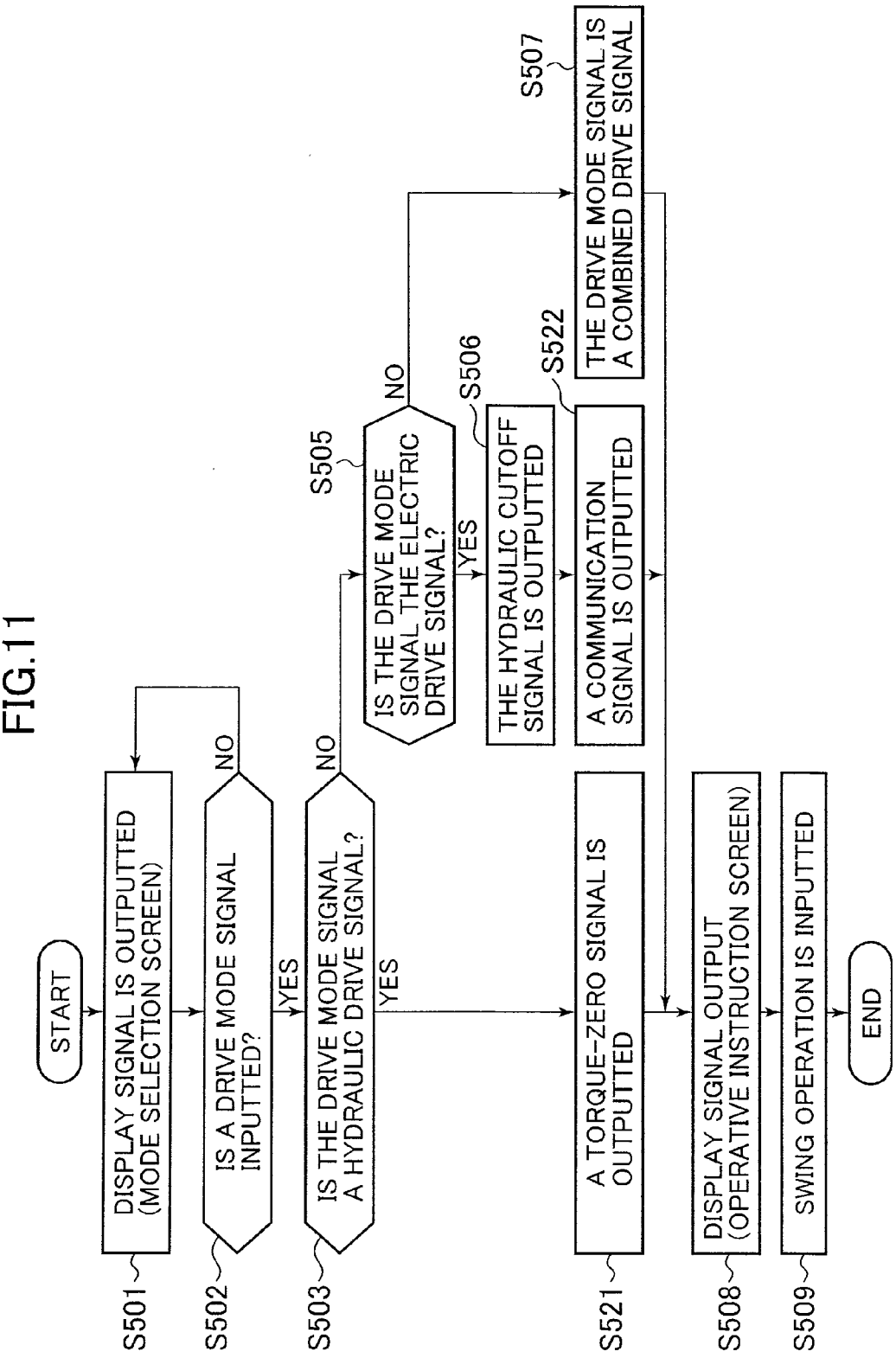

WORK MACHINE

TECHNICAL FIELD

The present invention relates to a work machine having two or more actuators for driving a common drive object, the actuators including a hydraulic actuator and an electric actuator.

BACKGROUND ART

A construction machine such as a hydraulic excavator is an example of a work machine having an actuator for driving a drive object. Such a construction machine burns fuel (gasoline, light oil or the like) in an engine to drive a hydraulic pump. Pressurized fluid thus produced drives a hydraulic actuator (a hydraulic motor, a hydraulic cylinder or the like). Hydraulic actuators are small-sized and light in weight and can produce significant power; therefore, they are widely employed as actuators for construction machines.

On the other hand, hybrid construction machines have recently been proposed which is intended to achieve an improvement in energy efficiency and energy saving, compared with the conventional construction machines using only hydraulic actuators. The hybrid construction machines use electric machinery (an electric motor) and an electrical storage device (a battery, an electric double layer capacitor or the like), which supplies and receives electricity to and from the electric machinery. In comparison with the hydraulic actuator, the electric machinery (the electric actuator) has, in terms of energy, excellent features such as (1) excellent energy efficiency and (2) regeneration of kinetic energy as electric energy during braking (release as heat in the case of a hydraulic actuator).

One of the hybrid work machines of this type is the construction machine as below (JP,A 124381). A hydraulic motor and electric machinery serving as actuators for swingably driving a swing structure and an operating device which outputs, through one operation, operating signals for simultaneously actuating the hydraulic motor and the electric machinery are mounted on the construction machine. In addition, the swing structure is driven by the total torque of the hydraulic motor and the electric machinery. This construction machine is such that the electric machinery is directly connected to the hydraulic motor. Output torque for each of the actuators (the hydraulic motor and the electric machinery) is determined according to the operation amount of the operating device (the swing control lever). For example, at the time of deceleration (braking), the electric machinery regenerates the kinetic energy of the swing structure and stores it as electric energy in the electric storage device. This technology combines the electric machinery and the hydraulic motor as the actuators for driving the swing structure. Therefore, even the operators who are familiar with the conventional hydraulic-actuator-drive construction machine can operate the operating device without a sense of discomfort. In addition, the technology intends to achieve energy saving with the simplified and easily realized configuration.

PRIOR ART LITERATURE

Patent Document

Patent Document 1: JP,A 2004-124381

SUMMARY OF THE INVENTION

Problem to be Solved by the Invention

Incidentally, after the assembly of a work machine provided with actuators or during the operation thereof, an actuator may have malfunctions or an output failure. In such a case, it is necessary to find out the cause of the malfunction of the actuator. Examples of malfunction concerning the actuator include: malfunctions such as absence of the output of the actuator upon operation of an operating device, and a difference between the operating direction and the actuating direction of the actuator; and an output failure in which the output of the actuator is deficient or excessive.

However, in the work machine having a plurality of the actuators actuated concurrently by the single operation as described above, if the operating device is operated, the outputs of the actuators are outputted in an indivisible manner and the total value thereof is inputted to the drive object (the swing structure). Therefore, it is difficult to determine which one of the actuators has a malfunction.

It is an object of the present invention to provide a work machine that can easily specify an actuator that has a malfunction among a plurality of actuators mounted thereon.

Means for Solving the Problem (1) To achieve the above object, a work machine of the present invention includes two or more actuators for driving a common drive object, the actuators including at least one hydraulic actuator and one electric actuator; a hydraulic pump for supplying pressurized fluid to the hydraulic actuator; an electric power supply device for supplying electricity to the electric actuator; an operating device for outputting, through a single operation, an operating signal for concurrently operating the hydraulic actuator and the electric actuator; and a controller for switching between a hydraulic-alone drive mode and an electric-alone drive mode, the hydraulic-alone drive mode being a mode to drive only the hydraulic actuator among the two or more actuators to thereby drive the drive object when the operating device is operated, the electric-alone drive mode being a mode to drive only the electric actuator among the two or more actuators to thereby drive the drive object when the operating device is operated.

(2) In the above (1), preferably, the work machine further includes a pair of hydraulic ports installed in a line for supplying pressurized fluid to the hydraulic actuator and a line for discharging pressurized fluid from the hydraulic actuator; and a measurement part for attaching thereto a measuring device for measuring at least one of a value and a phase of an electrical current and a value of voltage flowing in an electric power line connected to the electric actuator and a value of voltage of the electric power line.

(3) In the above (1), preferably, the work machine of the invention further includes first sensors for outputting pressure before and behind the hydraulic actuator; a second sensor for outputting a state of the electric current of the electric power line connected to the electric actuator; and a connection terminal for connection with display means for displaying at least one of output values of the first sensors and the second sensor at the time of selection of the hydraulic-alone drive mode or the electric-alone drive mode.

(4) In the above (1) to (3), preferably the work machine of the invention further includes line communicating means for allowing a line for supplying pressurized fluid to the hydraulic actuator to communicate with a line for discharging pressurized fluid from the hydraulic actuator, at the time of selection of the electric-alone drive mode; and the controller outputs a torque-zero signal as an operating signal for the electric actuator at the time of selection of the hydraulic-alone drive mode.

(5) In the above (2), preferably, the work machine of the invention further includes a pressure measuring device mounted to the pair of hydraulic ports, the pressure measuring device outputting pressure before and behind the hydraulic actuator; and an electric measuring device mounted to the measurement part, the electric measuring device outputting the current value of the electric power line connected to the electric actuator.

(6) In the above (4), preferably, the work machine of the invention further includes a sensor for outputting displacement of the hydraulic actuator or the electric actuator; and a connection terminal for connection with display means for displaying an output value of the sensor at the time of selection of the hydraulic-alone drive mode or the electric-alone drive mode.

(7) In the above (1), preferably, the work machine of the invention further includes sensors for outputting signals representing various states of the hydraulic actuator and the electric actuator; a storage unit having stored therein reference values of the signals of the various states serving as a reference for detecting the malfunction of the hydraulic actuator and the electric actuator, the reference values being values of the signals of the various states encountered when a predetermined operation is performed through the operating device in the case where the hydraulic-alone drive mode or the electric-alone drive mode is selected; and a connection terminal for connection with display means for displaying screens on the basis of a display signal outputted from the controller; and if the hydraulic-alone drive mode or the electric-alone drive mode is selected, the controller outputs to the operating device a display signal for requesting the predetermined operation of an operator via the operating device, and outputs to the connection terminal a display signal for displaying the relationship between the reference value and an output value of the sensor encountered when the operating device is operated based on the display signal.

(8) To achieve the above invention, a work machine of the present invention includes two or more actuators for driving a common drive object, the actuators including at least one hydraulic actuator and one electric actuator; a hydraulic pump for supplying pressurized fluid to the hydraulic actuator; an electric power supply device for supplying electricity to the electric actuator; an operating device for outputting, through a single operation, an operating signal for concurrently operating the hydraulic actuator and the electric actuator; and a controller for switching between a combined drive mode and an electric-alone drive mode, the combined drive mode being a mode to drive the two or more actuators to thereby drive the drive object when the operating device is operated, the electric-alone drive mode being a mode to drive only the electric actuator among the two or more actuators to thereby drive the drive object when the operating device is operated.

(9) To achieve the above object, a work machine of the present invention includes two or more actuators for driving a common drive object, the actuators including at least one hydraulic actuator and one electric actuator; a hydraulic pump for supplying pressurized fluid to the hydraulic actuator; an electric power supply device for supplying electricity to the electric actuator; an operating device for outputting, through a single operation, an operating signal for concurrently operating the hydraulic actuator and the electric actuator; and a controller for switching between a combined drive mode and a hydraulic-alone drive mode, the combined drive mode being a mode to drive the two or more actuators to thereby drive the drive object when the operating device is operated, the hydraulic-alone drive mode being a mode to only the hydraulic actuator among the two or more actuators to thereby drive the drive object when the operating device is operated.

Effect of the Invention

According to the present invention, the plurality of mounted actuators can individually be operated; therefore, an actuator that malfunctions can be specified easily.

BRIEF DESCRIPTION OF THE DRAWINGS

FIG. 11 is a flowchart for output checking processing for a swing electric motor 101 or a swing hydraulic motor 23 according to the third embodiment of the present invention.

MODE FOR CARRYING OUT THE INVENTION

Embodiments of the present invention will hereinafter be described with reference to the drawings taking a hydraulic excavator (a construction machine) as a work machine as an example.

Incidentally, the present invention can be applied to the overall work machines that have two or more actuators for driving a common drive object, the actuators including at least a hydraulic actuator and an electric actuator, and an operating device which outputs, through one operation, operating signals for simultaneously operating the hydraulic actuator and the electric actuator. The application of the present invention is not limited to hydraulic excavators. For example, the present invention can be applied also to construction machines such as wheel loaders having a track device and other work machines.

Figure 1:
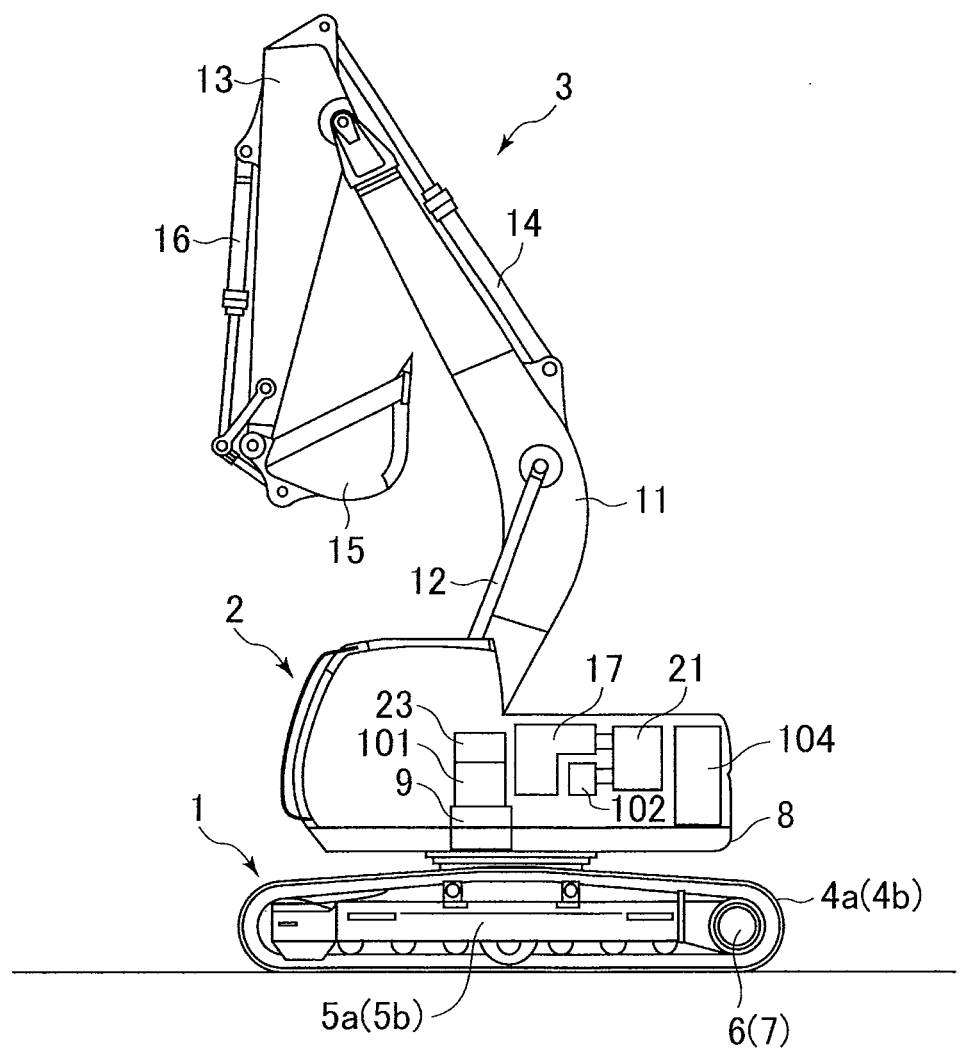
FIG. 1 is a lateral view of a hybrid hydraulic excavator according to an embodiment of the present invention.

FIG. 1 is a lateral view of a hybrid hydraulic excavator according to an embodiment of the present invention. The hybrid hydraulic excavator illustrated in the figure includes a lower track structure 1, an upper swing structure 2 and an excavating mechanism 3.

The lower track structure 1 includes a pair of crawlers 4a, 4b and crawler frames 5a, 5b (only one side is illustrated in FIG. 1), a pair of traveling hydraulic motors 6, 7 for independently exercising drive control on the corresponding crawlers 4a, 4b and deceleration mechanisms for the hydraulic motors 6, 7.

The upper swing structure 2 includes a swing frame 8, an engine 21 as a prime mover installed on the swing frame 8, an assisting power-generating motor 102 driven by the engine 21, a swing electric motor (an electric actuator) 101, a swing hydraulic motor (a hydraulic actuator) 23, an electric double layer capacitor (an electric power supply device) 104 for supplying electricity to the assisting power-generating motor 102 and the swing electric motor 101 (the electric actuator), and a deceleration mechanism 9 for decelerating the rotation of the swing electric motor 101 and the swing hydraulic motor 23. The driving force of the swing electric motor 101 and that of the swing hydraulic motor 23 are transmitted via the deceleration mechanism 9 to the upper swing structure 2 (the swing frame 8) to drive and swing the upper swing structure 2 (the swing frame 8) with respect to the lower track structure 1.

An excavating mechanism (a front work implement) 3 is mounted on the upper swing structure 2. The excavating mechanism 3 includes a boom 11; a boom cylinder 12 for driving the boom 11; an arm 13 turnably supported near the leading end of the boom 11; an arm cylinder 14 for driving the arm 13; a bucket 15 turnably supported at the end of the arm 13; and a bucket cylinder 16 for driving the bucket 15.

A hydraulic system 17 for driving hydraulic actuators such as the above-mentioned traveling hydraulic motors 6, 7, swing hydraulic motor 23, boom cylinder 12, arm cylinder 14, and bucket cylinder 16, etc. is mounted on the swing frame 8 of the upper swing structure 2. The hydraulic system 17 includes a hydraulic pump 22 (see FIG. 2) for supplying pressurized fluid to these hydraulic actuators from a tank 25; and a control valve (a directional control valve) 24 (see FIG. 2) for controllably driving the hydraulic actuators. Incidentally, only a control valve for controlling the swing hydraulic motor 23 is depicted as the control valve 24 in FIG. 2. The hydraulic pump 22 is driven by the engine 21.

Figure 2:
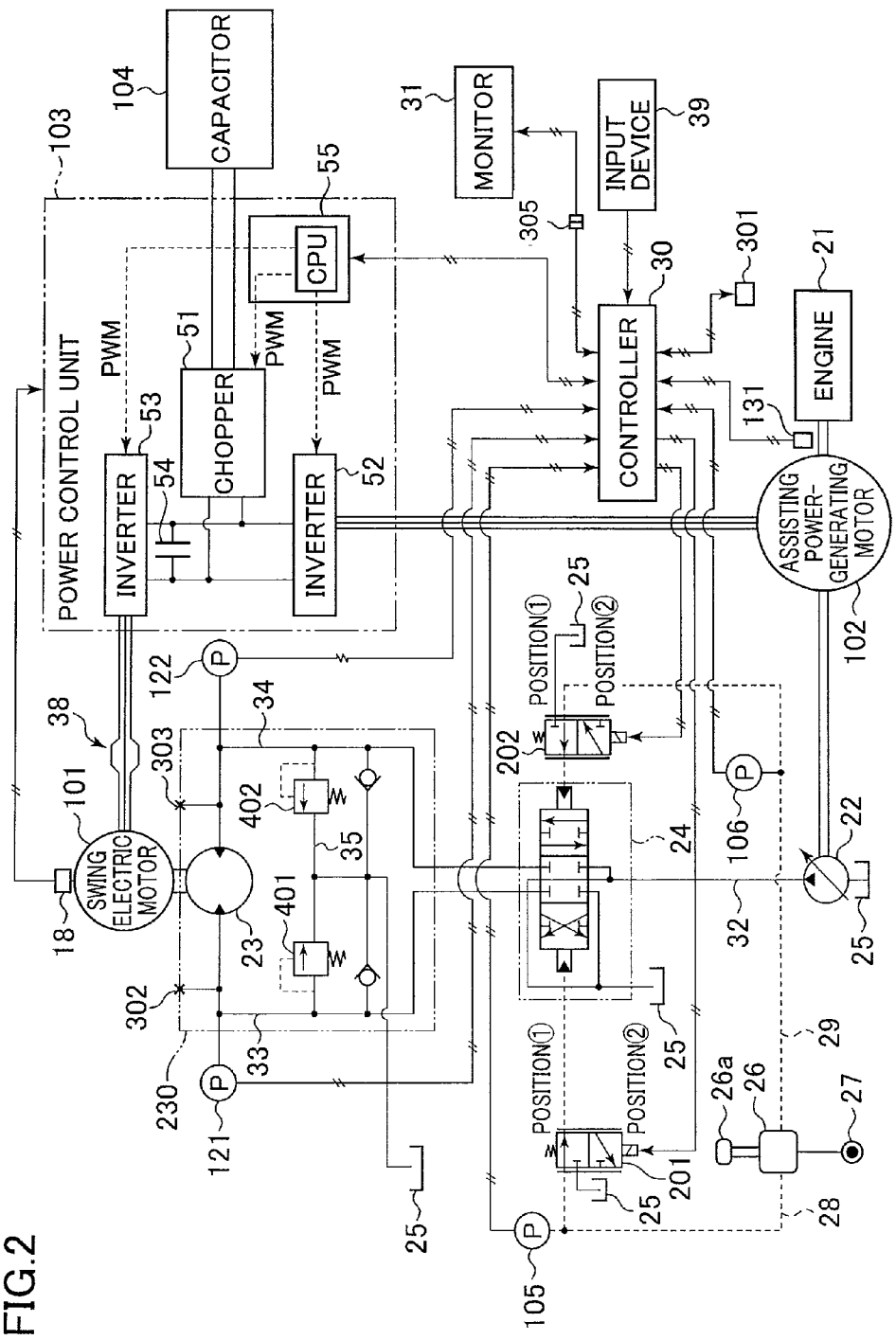
FIG. 2 is a configurational view of a swing structure drive control system of the hydraulic excavator according to a first embodiment of the present invention.

FIG. 2 is a configurational view of a swing structure drive control system of the hydraulic excavator according to a first embodiment of the present invention. The system shown in FIG. 2 includes a swing electric motor 101 for driving the upper swing structure 2; an operating device (a swing control lever 26a) 26 for outputting a hydraulic operating signal (pilot pressure) for operating the swing motion of the upper swing structure 2; a main controller 30 for mainly controlling the swing electric motor 101, the display device 31 and solenoid control valves 201, 201; a power control unit 103 for controlling the swing electric motor 101 and the assisting power-generating motor 102 on the basis of an electrical operating signal (a velocity command V*) outputted from the main controller 30; the swing hydraulic motor 23 for driving the upper swing structure 2; the hydraulic pump 22 for supplying pressurized fluid to the hydraulic actuators such as the swing hydraulic motor 23; the control valve 24 for controlling the swing hydraulic motor 23; the display device (the monitor) 31 installed in a cabin; an input device 39 used by an operator to input an instruction to the main controller 30; and a connection terminal 305 for connection with the display device 31.

The operating device 26 has the control lever (the swing control lever) 26a. The swing control lever 26a is operated by an operator to produce a hydraulic operating signal (pilot pressure) according to the operating direction and operation amount of the swing control lever 26a. The pilot pressure is produced by reducing the primary pressure produced by the pilot pump 27 into secondary pressure according to the operation amount of the operating device 26.

The pilot pressure specified by the operation amount of the operating device 26 is sent to the pressure-receiving part of the spool-type control valve (the directional control valve) 24 via lines 28, 29 to operatively switch the control valve 24 from the neutral position shown in the figure. The control valve 24 controllably switches the flow of the pressurized fluid produced by the hydraulic pump 22 powered by the engine 21, thereby controlling the drive of the swing hydraulic motor 23.

Pressure sensors 105, 106 for detecting the pilot pressure (the hydraulic operating signal) outputted from the operating device 26 and sending it to the main controller 30 are installed in the respective pilot lines 28, 29. The main controller 30 produces an electric operating signal proportional to the output values of the pressure sensors 105, 106 and sends the electric operational signal thus produced to the power control unit 103. The power control unit 103 controllably drives the swing electric motor 101 on the basis of the electric operating signal.

As described above, the hydraulic excavator of the present invention is configured such that the swing hydraulic motor 23 and the swing electric motor 101 are concurrently operated on the basis of the hydraulic operating signal produced by applying the single operation to the operating device 26.

The respective rotating shafts (the output shafts) of the swing electric motor 101 and the swing hydraulic motor 23 are connected to each other. The swing electric motor 101 and the swing hydraulic motor 23 drive the upper swing structure 2 via the deceleration mechanism 9 (see FIG. 1). Incidentally, the swing electric motor 101 and the swing hydraulic motor 23 may indirectly be connected to each other via a mechanical mechanism or the like as long as they are configured to be able to drive the upper swing structure 2, which is a common drive object. The capacitor 104 is charged or discharged depending on the drive state (in normal operation or regenerative operation) of the assisting power-generating motor 102 and the swing electric motor 101.

A position sensor (a magnetic pole position sensor) 18 for detecting the turning position of the upper swing structure 2 is installed on the rotating shaft of the swing electric motor 101. In short, the position sensor 18 is a sensor for outputting the displacement of the swing electric motor 101. The output value of the position sensor 18 is outputted to the power control unit 103 and is used for the calculation of the actual velocity of the upper swing structure 2 and the like. Incidentally, since the rotating shafts of the swing electric motor 101 and the swing hydraulic motor 23 are connected to each other in the present embodiment, the rotational position of the swing hydraulic motor 23 may be detected by the position sensor 18.

The swing hydraulic motor 23 is driven by the pressurized fluid supplied from the hydraulic pump 22 via the control valve 24. The swing hydraulic motor 23 and the control valve 24 are connected to each other through the lines 33, 34. In addition, the pressurized fluid is supplied to or discharged from the swing hydraulic motor 23 via the lines 33, 34. The lines 33, 34 are provided with corresponding pressure sensors 121, 122, which are paired, and corresponding hydraulic ports 302, 303, which are paired (see FIG. 2).

The pressure sensors 121, 122 are used to electrically detect the pressures (the drive pressures) before and behind the swing hydraulic motor 23 and output electric signals according to the pressures to the main controller 30. The output values of the pressure sensors 121, 122 are used for the calculation of the actual torque value of the swing hydraulic motor 23.

The hydraulic ports (the pressure detection ports) 302, 303 are ports for detecting the pressures in the lines 33, 34. Pressure measuring devices such as, for example, bourdon tube gauges are attached to the hydraulic ports. The pressure measuring devices are attached to the hydraulic ports 302, 303, so that they can mechanically measure the pressure of the pressurized fluid flowing in each of the lines 33, 34, i.e., the pressures before and behind the swing hydraulic motor 23. In short, the pressure measuring devices can directly measure the pressure of the pressurized fluid in each of the lines 33, 34.

Relief valves 401, 402 are installed in a line 35 connecting the two lines 33, 34. The relief valves 401, 402 protect the circuit by eliminating abnormal pressure occurring at the time of acceleration or deceleration of swing.

The assisting power-generating motor 102 is connected between the hydraulic pump 22 and the engine 21. The assisting power-generating motor 102 has a function as a generator converting the power of the engine 21 into electric energy and outputting it to the inverter devices 52, 53. In addition, the assisting power-generating motor 102 has also a function as an electric motor using the electric energy supplied from the capacitor 104 to assisting-drive the hydraulic pump 22. The inverter device 52 converts the electric energy of the capacitor 104 into AC power and supplies it to the assisting power-generating motor 102, thereby assisting-driving the hydraulic pump 22.

Incidentally, in the present embodiment, the pilot pressure (the hydraulic operating signal) outputted from the operating device 26 is detected by the pressure sensors 105, 106 and converted into the electric signal, which is outputted to the main controller 30. However, a configuration may be adopted in which an electric operating signal according to the operation amount of the operating device 26 is directly outputted to the main controller 30. In this case, a position sensor (e.g. a rotary encoder) can be used which detects the rotary displacement of the control lever 26a of the operating device 26. In the present embodiment, the pilot pressure is applied to the control valve 24 to control the spool position of the control valve 24. However, the control valve 24 may be a solenoid valve whose spool position is controlled by an electric signal. Further, in the present embodiment, only the pressure sensors 105, 106 detect the operation amount of the operating device 26. However, combinations of sensors having different detection systems, such as, for example, a combination of the pressure sensors 105, 106 and the above-mentioned position sensor can be used. In this way, even if one of the sensors has failure, the other sensors can deal with the failure. Thus, the reliability of the system can be improved.

Figure 6:
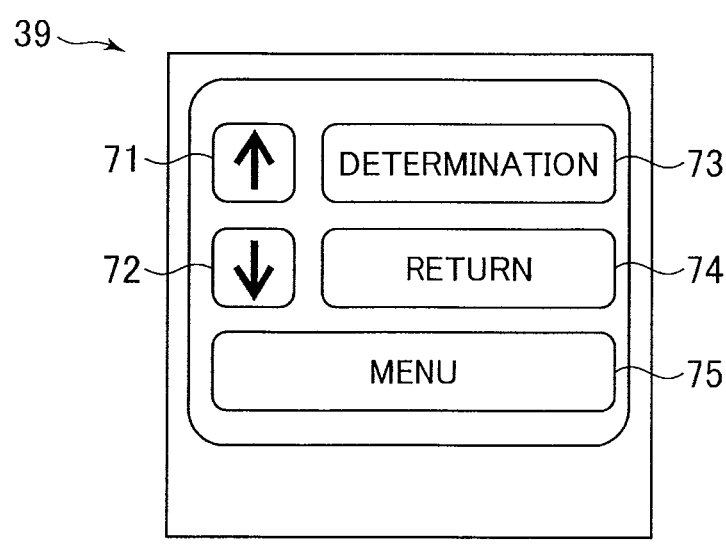
FIG. 6 illustrates an input device 39 by way of example.

The input device 39 (e.g. a switch) is used by an operator to input a desired drive mode of the upper swing structure 2. An example of the input device 39 is shown in FIG. 6 described later. The drive modes capable of being inputted via the input device 39 are three modes: (1) a mode of driving the swing hydraulic motor 23 alone (a hydraulic-alone drive mode), (2) a mode of driving the swing electric motor 101 alone (an electric-alone drive mode), and (3) a normal drive mode of driving the swing electric motor 101 and the swing hydraulic motor 23 in a combined manner. (1) The hydraulic-alone drive mode and (2) the electric-alone drive mode are modes for checking the output of each of the actuators 23, 101 in case of the occurrence of a malfunction or at the time of inspection, a test or the like. (3) The combined drive mode is a mode for concurrently driving the actuators 23, 101 for normal swing motion.

The drive mode specified by an operator via the input device 39 is outputted as a drive mode signal to the main controller 30. Drive mode signals include (1) "a hydraulic drive signal" outputted if the hydraulic-alone drive mode is selected, (2) "an electric drive signal" outputted if the electric-alone drive mode is selected, and (3) "a combined drive signal" outputted if the combined drive mode is selected.

The display device (the monitor) 31 is used to display screens on the basis of a display signal (a display command) inputted from the main controller 30. In addition, the display device 31 is connected to the main controller 30 via the connection terminal 305. The display device 31 displays information necessary upon selection of the drive mode via the input device 39. The display device 31 sometimes displays output values of various sensors (e.g. the pressure sensors 121, 122, the position sensor 18, and a three-phase current sensor 19) for detecting the various conditions of the swing hydraulic motor 23 and the swing electric motor 101. In addition, the display device 31 sometimes displays instructions for requiring a predetermined operation of an operator via the operating device 26. Incidentally, the input device 39 may be omitted by mounting a display device with an input function (e.g. a touch panel in which the display device per se serves as an input device).

The main controller 30 is used to perform processing on the drive control of the swing electric motor 101, the display control of the display device 31 and the position control of the solenoid valves 201, 202. In addition, the main controller 30 includes a storage unit composed of a RAM, a ROM, a flash memory or the like and an arithmetic and control unit (CPU) for performing various processing in accordance with the program stored in the storage unit.

Signals inputted into the main controller 30 include drive mode signals (a hydraulic drive signal, an electric drive signal, a combined drive signal) outputted from the input device 39 (or which may be the display device 31); an output value from an engine rotating velocity sensor 131; output values from the pressure sensors 105, 106; output values from the pressure sensors 121, 122; and various signals outputted from the power controller 55. On the other hand, signals outputted from the main controller 30 include an electric operating signal outputted to the power controller 55 to control the swing electric motor 101; cutoff signals (hydraulic cutoff signals) outputted to the solenoid control valves 201, 202 to cut off the input of the hydraulic operating signal to the control valve 24; a cutoff signal (an electric cutoff signal) outputted to the power controller 55 to cut off the input of the electric operating signal to the power controller; and a display signal outputted to the display device 31.

The main controller 30 calculates the target velocity V* of the swing electric motor 101 on the basis of the output values of the pressure sensors 105, 106 and the actual rotating velocity (the actual velocity V) of the swing electric motor 101 inputted via the power controller 55 and outputs to the power controller 55 the operating signal (the electric operating signal (the velocity command)) of the swing electric motor 101 corresponding to the target velocity V*. Incidentally, the actual velocity V of the swing electric motor 101 can be calculated from the rotational position detected by the position sensor 18.

The main controller 30 exercises also the power regeneration control for recovering electric energy from the swing electric motor 101 during the braking of the upper swing structure 2. Further, if the power regeneration control is exercised or if surplus electricity occurs because of a light hydraulic load, the main controller 30 controls storage of the recovered electric power or surplus electricity in the capacitor 104.

The power control unit 103 includes the inverter device (the power converter) 52 for controlling the assisting power-generating motor 102; the inverter device (the power converter) 53 for controlling the swing electric motor 101; a chopper 51 for boosting DC power from the capacitor 104 to a predetermined bus voltage and outputting it to the inverter devices 52, 53; a smoothing capacitor 54 for stabilizing the bus voltage; and a power controller 55. The inverter devices 52, 53, the chopper 51 and the main controller 30 exchange signals necessary for control via communication lines.

The inverter devices (the power converters) 52, 53 are connected to the capacitor 104 via the chopper 51. The inverter devices 52, 53 convert the DC power charged in the capacitor 104 into AC power (three-phase AC) by switching, and supply it to the swing electric motor 101 and the assisting power-generating motor 102 to control the swing electric motor 101 and the assisting power-generating motor 102. Each of the inverter devices 52, 53 includes an inverter circuit having a switching element (e.g. an IGBT (an insulated gate bipolar transistor)), and a driver circuit for exercising the drive control of the inverter circuit.

The capacitor 104 supplies electric power to the inverter devices 52, 53 via the chopper 51 and stores the electric energy generated by the assisting power-generating motor 102 or the electric energy regenerated by the swing electric motor 101. The capacitor 104 may be replaced with an electric storage unit such as a battery.

The power controller 55 has an arithmetic and control device (CPU) as means for performing various arithmetic processing in accordance with programs stored in a storage unit (a RAM, a ROM, a flash memory or the like).

The power controller 55 has an electric operating signal (a velocity command) inputted from the main controller 30, pressure information outputted from the pressure sensors 105, 106, rotational position information of the swing electric motor 101 outputted from the position sensor 18, and actual current information outputted from the three-phase motor current sensor 19.

The power controller 55 uses the information of the position sensor 18 and the current sensor 19 and outputs a gate control signal to the inverter device 53 so as to meet the velocity command received from the main controller 30. More specifically, the power controller 55 outputs the torque command (the control signal) produced by taking into account the electric operating signal inputted from the main controller 30, a torque limit specified by the restriction of machine-performance, a rotational position (actual velocity V) of the swing electric motor 101 detected by the position sensor 18, and a current value (actual current) detected by the three-phase motor current sensor 19 (see FIG. 3). Then, the power controller 55 controls the on-off of the switching element of the inverter device 53 on the basis of the torque command thus outputted, thereby controlling the swing electric motor 101.

The power controller 55 calculates the actual velocity V of the swing electric motor 101 on the basis the rotational position of the swing electric motor 101 detected by the position sensor 18 and outputs (feeds back) it to the main controller 30.

Incidentally, in the present embodiment, the main controller 30 outputs the velocity command as the electric operating signal; however, a swing torque command may be used in place of the velocity command. In this case, the power controller 55 feeds back the actual torque value of the swing electric motor 101 to the main controller 30.

Figure 3:
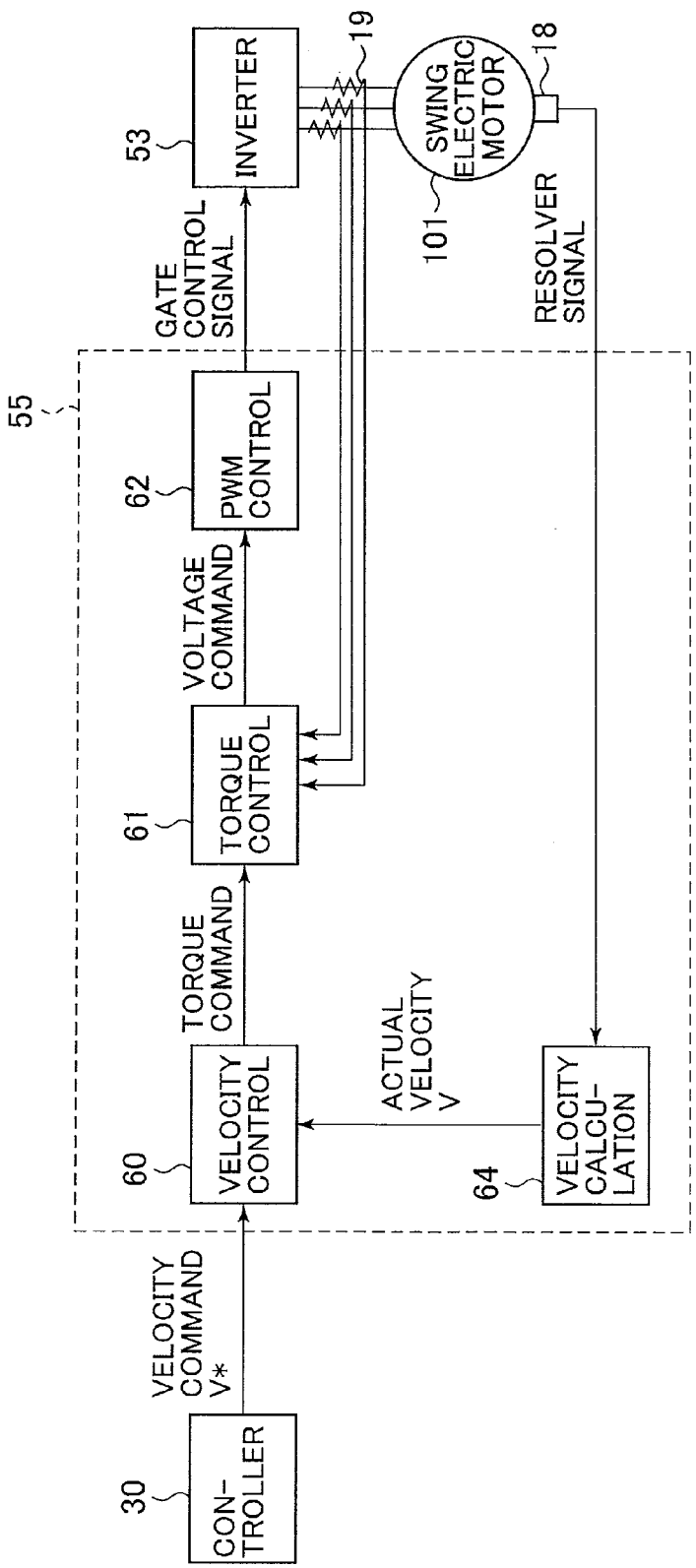
FIG. 3 is a function block diagram of a power controller 55 according to each embodiment of the present invention.

FIG. 3 is a functional block diagram of the power controller 55 according to each embodiment of the present invention. As shown in FIG. 3, the power controller 55 includes a velocity control section 60, a torque control section 61, a PWM control section 62, and a velocity calculation section 64. The power controller 55 controls the velocity of the swing electric motor 101 through feedback control.

The velocity control section 60 performs processing for producing a torque command for the torque control section 61 so as to allow the actual velocity V calculated by the velocity calculation section 64 to follow the velocity command (the target velocity V*).

The torque control section 61 performs processing for producing a voltage command so as to allow actual torque to follow the torque command produced by the velocity control section 60. The torque control section 61 cannot sometimes allow the electric motor 16 to follow the torque command outputted from the velocity control section 60 due to the restriction of machine-performance concerning the hydraulic excavator or the like. In such a case, the torque control section 61 performs processing for subjecting the torque command to restriction (i.e., processing for reducing the torque command outputted from the velocity control section 60 as necessary).

The PWM control section 62 performs processing for producing a gate control signal through Pulse Width Modulation.

The torque command produced by the velocity control section 60 is corrected by the torque control section 61 and converted into a voltage command. The voltage command produced by the torque control section 61 is outputted to the PWM control section 62 and converted into a gate control signal. The gate control signal produced in the PWM control section 62 is outputted to the inverter device 53. Incidentally, in the present embodiment, the torque control of the swing electric motor 101 is performed by exercising feedback control so as to allow the actual current of the current sensor 19 to follow the current command corresponding to the torque command.

The velocity calculation section 64 calculates the actual velocity V of the upper swing structure 2. The velocity calculation section 64 receives the rotational position information (the resolver signal) of the swing electric motor 101 outputted from the position sensor 18. The velocity calculation section 64 calculates the actual velocity V from the rotational position information.

Incidentally, while the main controller 30 receives the electric drive signal from the input device 39 (in other words, excluding while the main control 30 receives the hydraulic drive signal and the combined drive signal), the main controller 30 outputs the cutoff signals to the solenoid control valves 201, 202.

The solenoid control valves 201, 202 are used to switch between the input and cutoff of the hydraulic operation signal to the control valve 24. The solenoid control valve 201 is installed in the pilot line 28, and the solenoid control valve 202 in the pilot line 29. The solenoid control valves

201, 202 are designed to receive the cutoff signal from the main controller 30. If the solenoid control valves 201, 202 receive the cutoff signal, the switch positions of the solenoid control valves 201, 202 are switched from position 1 to position 2 in FIG. 2. More specifically, if the combined drive mode and the hydraulic-alone drive mode are selected, the solenoid control valves 201, 202 are each located at position 1. If the electric-alone drive mode is selected, the solenoid control valves 201, 202 are each located at position 2. If the switching position of each of the solenoid control valves 201, 202 is switched to position 2, the pilot pressure (the hydraulic operating signal) outputted to the control valve 24 from the operating device 26 is cut off, so that the control valve 24 is held at the neutral position shown in FIG. 2. In this way, the supply of the pressurized fluid from the hydraulic pump 22 is cut off, so that the swing hydraulic motor 23 is not driven.

Figure 4:
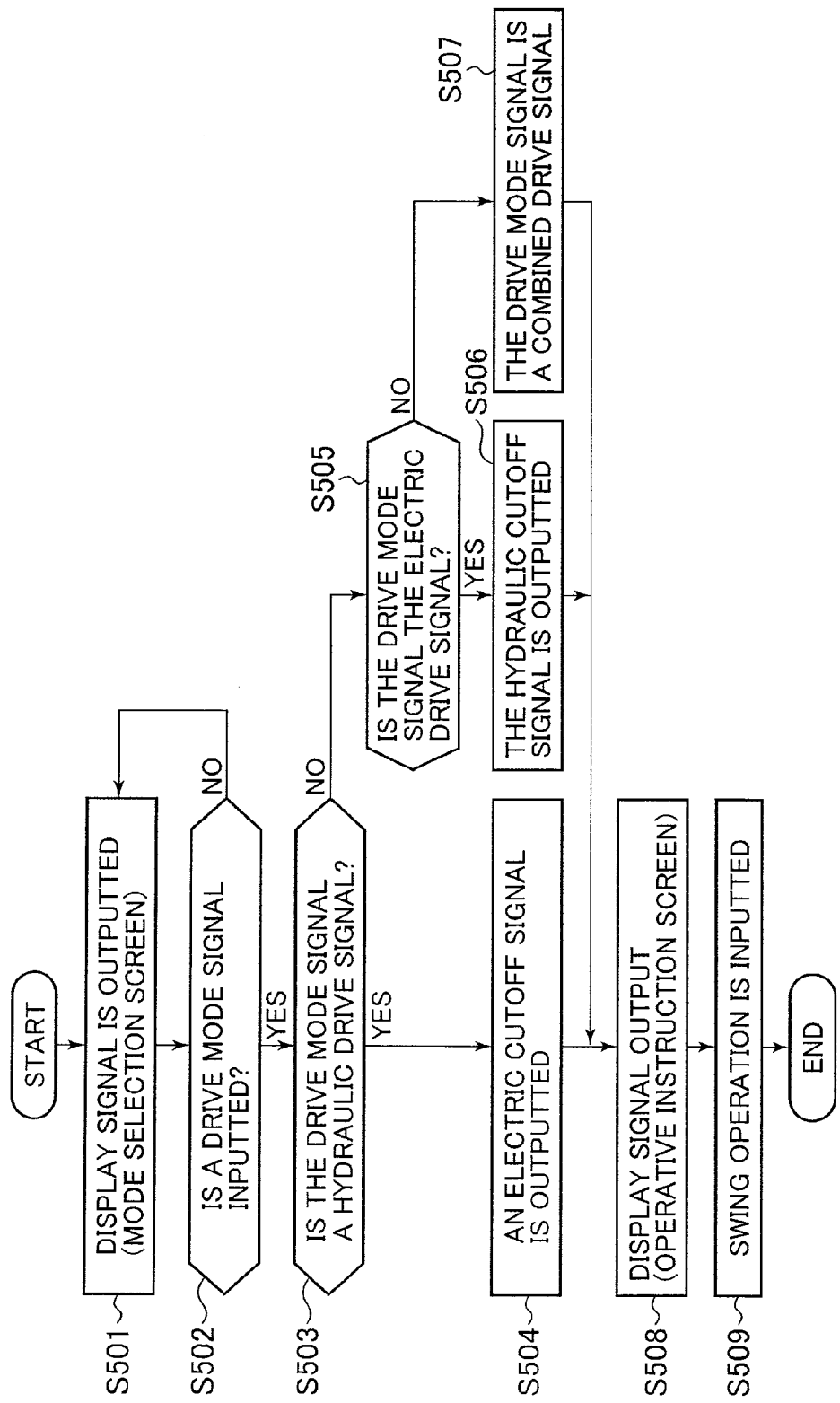
FIG. 4 is a flowchart for output checking processing for a swing electric motor 101 or a swing hydraulic motor 23 according to the first embodiment of the present invention.
Figure 5:
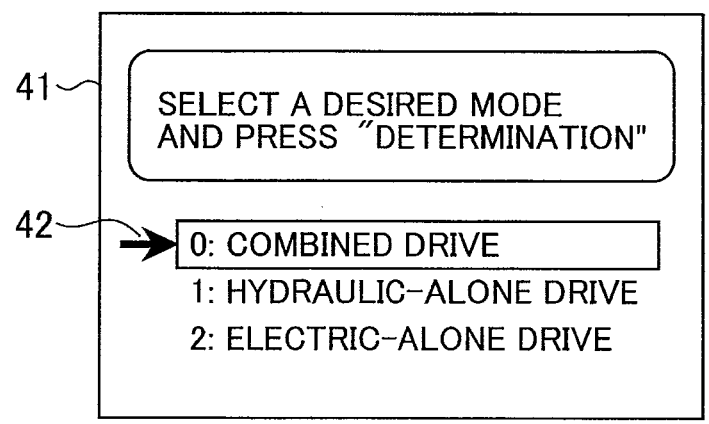
FIG. 5 illustrates a mode selection screen displayed on a display device 31 by way of example.
Figure 7:
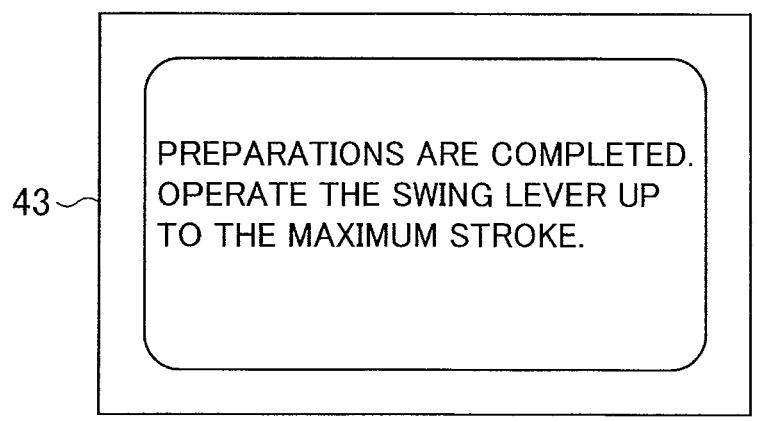
FIG. 7 illustrates an operation instruction screen displayed on the display device 31 by way of example.

A method of checking the output of the swing electric motor 101 or swing hydraulic motor 24 of the hydraulic excavator according to the present embodiment is described with reference to the drawings. FIG. 4 is a flowchart for output checking processing for the swing electric motor 101 or the swing hydraulic motor 23 according to the first embodiment of the present invention. FIG. 5 illustrates a mode selection screen displayed in the display device 31 by way of example. FIG. 6 illustrates the input device 39 by way of example. FIG. 7 illustrates an operation instruction screen displayed in the display device 31 by way of example.

It may be necessary to check the output of an actuator if the output failure of the swing electric motor 101 or the swing hydraulic motor 23 is doubted after the assembly of the hydraulic excavator described above or in the operation site thereof. In such a case, the function and output of the swing electric motor 101 or the swing hydraulic motor 23 are individually checked by the procedure described next.

A description is first given of the case of checking the output of the swing electric motor 101. If the output of the swing electric motor 101 is checked, the operating device 26 is brought into a non-operation state to hold the engine 21 at a predetermined rotating speed and output checking processing is started. If the processing is started, the main controller 30 outputs to the display device 31 a display signal for displaying a mode selection screen 41 (FIG. 5) on a screen (S501). In this state, an operator shifts a cursor 42 on the screen 41 using upper and lower buttons 71, 72 of the input device 39 (FIG. 6) and selects "2: electric-alone drive mode". In this way, the electric drive signal is outputted as a drive mode signal to the main controller 30. The main controller 30 having received the input of the drive mode signal proceeds to the next processing (S502).

If the drive mode signal is the electric drive signal (S505), the main controller 30 outputs a cutoff signal (a hydraulic cutoff signal) to the solenoid control valves 201, 202 (S506). In this way, the switching positions of the solenoid control valves 201, 202 are each switched from position 1 to position 2.

After the switching of the solenoid control valves 201, 202, the main controller 30 outputs to the display device 31 a display signal for displaying an operative instruction screen 43 (FIG. 7) on the screen (S508). It is displayed as the operative instruction screen 43 on the display device 31 that the preparation of the output check has been completed and the operation of the operating device 26 by an operator is requested.

If the operator operates the operating device 26 in accordance with the operative instruction on the operative instruction screen 43 (S509), pilot pressure occurs in the pilot lines 28, 29 in accordance with the operation amount of the operating device 26. At this time, the circuit is cut off by the solenoid control valves 201, 202; therefore, the pilot pressure does not occur downstream of the solenoid control valves 201, 202, so that the control valve 24 is held at the neutral position. The main controller 30 produces an electric operation signal on the basis of the output values of the pressure sensors 105, 106 and outputs it to the power controller 55. The power controller 55 drives the swing electric motor 101 on the basis of the electric operation signal thus inputted. In this way, the swing electric motor 101 can be driven alone of the two actuators (the swing electric motor 101 and the swing hydraulic motor 23) for driving the upper swing structure 2. Therefore, the output of only the swing electric motor 101 can be checked.

The output power of the swing electric motor 101 is proportional to a current value. Therefore, one of methods of checking the output power of the swing electric motor 101 involves measuring a value of an electric current flowing in an electric power line connected to the swing electric motor 101 and calculating the output torque of the swing electric motor 101 from the measured value. If the swing electric motor 101 is a three-phase motor as in the present embodiment, it is needed only to measure the current value of each phase. For example, a clamp meter (a line-current tester), which can measure a current value without disconnecting an electric circuit, is available as a measuring device for measuring a current value of each phase. It is preferred that each electric power line may be sandwiched at the central portion of a transformer core of the clamp meter in view of easy current measuring work using the clamp meter and the reduction of error of the measured value. In terms of this point, to make it easy to attach the clamp meter onto the cover of an electric power line, a measurement part 38 (see FIG. 2) is provided in which intervals among the three electric power lines of the swing electric motor 101 are each set at a predetermined value in the present embodiment. In view of the improved working efficiency, it is preferred that the measurement part 38 be installed at an externally easy access position. Alternatively, a current measuring device such as a clamp meter may be previously installed at the measurement part 38 and the output power of the swing electric motor 101 may be checked by checking the output value of the current measuring device.

By detecting the rotating direction of the swing electric motor 101, it is possible to check whether or not the operating direction of the operating device 26 coincides with the turning direction of the upper swing structure 2. The rotating direction of the swing electric motor 101 can be detected by using e.g. a phase indicator (preferably, a non-contact phase indicator). Incidentally, when phases are detected with a phase indicator, it is necessary to attach clips to respective electric power lines. Therefore, it is preferred that the measurement part 38 be used similarly to the clamp meter.

Further, a method of checking the output power of the swing electric motor 101 may involve measuring a voltage value of an electric current flowing in electric power lines connected to the swing electric motor 101 and calculating the output torque of the swing electric motor 101 from the measured value. In this case, if a non-contact voltage measurement device is used which can measure voltage of an electric power line from on the cover thereof, voltage can easily be measured using the measurement part 38 similarly to the above measurement of the electric current value. Alternatively, the voltage measurement device may be previously installed at the measurement part 38 and the output power of the swing electric motor 101 may be checked by checking the output value of the voltage measurement device. As described above, the measurement device (e.g. the clamp meter, the phase indicator and the voltage measurement device) for measuring at least one of the value and phase of a current flowing in the electric power line and the voltage value of the electric power line can be installed at the measurement part 38.

Incidentally, the output shaft of the swing electric motor 101 is connected to the output shaft of the swing hydraulic motor 23 in the present embodiment. Therefore, the output torque of the swing electric motor 101 may indirectly be checked by measuring the torque inputted to the swing hydraulic motor 23 from the swing electric motor 101. In this case, the swing hydraulic motor 23 functions as a hydraulic pump. The torque inputted to the swing hydraulic motor 23 is proportional to the product of the capacity q of the swing hydraulic motor 23 and the anteroposterior differential pressure $\Delta P$. Therefore, a method of checking torque inputted to the swing hydraulic motor 23 involves measuring the anteroposterior differential pressure $\Delta P$ of the swing hydraulic motor 23 and calculating the torque inputted to the swing hydraulic motor 23 from the value thus measured. For example, a bourdon tube gauge can be available as a measurement device for measuring the anteroposterior differential pressure $\Delta P$. To that end, the pair of hydraulic ports 302, 303 for attachment of the bourdon tube gauge thereto is installed in the respective lines 33, 34 connected to the swing hydraulic motor 23 in the present embodiment. Alternatively, a pressure measuring device such as a bourdon tube gauge or the like may previously be installed on the hydraulic ports 302, 303 and torque inputted to the swing hydraulic motor 23 may be checked by checking the detected value of the pressure measuring device. Incidentally, while the torque inputted to the swing hydraulic motor 23 is smaller than torque defined by the relief pressure of the relief valves 401, 402 and the capacity q, the swing hydraulic motor 23 (the upper swing structure 2) is maintained in a resting state.

The rotational direction of the swing hydraulic motor 23 can be detected by comparing the pressure of the hydraulic port 302 with that of the hydraulic port 303. Therefore, it is possible to check whether or not the rotational direction of the swing hydraulic motor 23 coincides with the operating direction of the operating device 26.

Incidentally, if the torque inputted to the swing hydraulic motor 23 is greater than torque defined by the relief pressure of the relief valves 401, 402 and the capacity q of the swing hydraulic motor 23, it becomes difficult to calculate the torque because of actuation of the relief valves 401, 402. However, the pressure at which the relief valves 401, 402 are each actuated is measured by the pressure sensors 121, 122 or the pressure measuring devices attached to the hydraulic ports 302, 303. The pressure thus measured is compared with a preset relief pressure of the relief valves 401, 402. In this way, it can be checked whether or not the relief valves 401, 402 are actuated in a normal way.

A description is next given of the case of checking the output of the swing hydraulic motor 23. Also in the case of checking the output of the swing hydraulic motor 24, similarly to the above, the operating device 26 is brought into the non-operated state, the engine 21 is kept at a predetermined rotating speed and output checking processing is started. If the processing is started, the main controller 30 outputs to the display device 31 a display signal for displaying the mode selection screen 41 (FIG. 5) on the screen (S501). In this state, an operator shifts the cursor 42 on the screen 41 using the upper and lower buttons 71, 72 of the input device 39 (FIG. 6) and selects "1: hydraulic-alone drive mode". In this way, the hydraulic drive signal is outputted as a drive mode signal to the main controller 30. The main controller 30 having received the input of the drive mode signal proceeds to the next processing (S502).

If the drive mode signal is the hydraulic drive signal (S503), the main controller 30 outputs a cutoff signal (an electric cutoff signal) to the power controller 55 (S504). In this way, the power controller 55 interrupts the drive control of the swing electric motor 101 regardless of the output values of the pressure sensors 105, 106.

After outputting the electric cutoff signal, the main controller 30 outputs to the display device 31 a display signal for displaying the operative instruction screen 43 (FIG. 7) on the screen (S508). It is displayed on the display device 31 that the preparation of the output check has been completed and the operation of the operating device 26 by an operator is requested.

If the operator operates the operating device 26 in accordance with the operative instruction of the operative instruction screen 43 (S509), the spool of the control valve 24 is switched by pilot pressure occurring in the pilot lines 28, 29 in response to the operation amount of the operating device 26. In this way, pressurized fluid is supplied from the hydraulic pump 22 to the swing hydraulic motor 23 to operate it, which produces in the lines 33, 34 pressure in accordance with the output torque of the swing hydraulic motor 23. In this way, the swing hydraulic motor 23 can be driven alone of the two actuators for driving the upper swing structure 2. Thus, the output of only the swing hydraulic motor 23 can be checked.

As described earlier, the output torque of the swing hydraulic motor 23 is proportional to the product of the capacity q and anteroposterior differential pressure $\Delta P$ of the swing hydraulic motor 23. Therefore, the anteroposterior differential pressure $\Delta P$ of the swing hydraulic motor 23 may be measured and the output torque of the swing hydraulic motor 23 may be calculated from the value thus measured. Also in this case, the output of the swing hydraulic motor 23 may be checked by calculating the torque inputted to the swing electric motor 101 from the swing hydraulic motor 23 in place of the calculation of the output torque of the swing hydraulic motor 23.

As described above, the upper swing structure 2 is swingably driven by the swing hydraulic motor 23 and the swing electric motor 101 which have the different drive sources. In this case, to check the function and output of the swing electric motor 101, the state quantity of the swing hydraulic motor 23 which swingably drives the upper swing structure 2 along with the swing electric motor 101 is used. In addition, to check the function and output of the swing hydraulic motor 23, the state quantity of the swing electric motor 101 is used. In this way, the check can be performed using the simple device without using an additional dedicated measuring instrument or the like.

According to the present embodiment described above, only one of the two actuators (the swing hydraulic motor 23 and the swing electric motor 101) for driving the common drive object (the upper swing structure 2) can be driven. In this way, the output torque of one of the actuators can easily be checked; therefore, the actuator that malfunctions can be specified easily.

Incidentally, the above embodiment describes the case of the two actuators; however, the present invention can be applied to the case where three or more actuators are present.

In this case, it is only needed to output the same cutoff signal as that of the present embodiment to the other actuators excluding one actuator being an output-check object.

A description is next given of a second embodiment of the present invention. In the first embodiment, the pressure measuring device (the bourdon tube gauge) and the current measuring device (the clamp meter) are used by a person such as an operator or the like to measure the differential pressure value and the current value, respectively, whereby the torque of the swing hydraulic motor 23 and that of the swing electric motor 101 are calculated. However, in the present embodiment, to control the drive of the swing hydraulic motor 23 and the swing electric motor 101, the detected values of the sensors (the pressure sensors 121, 122, and the three-phase motor current sensor 19) incorporated in the hydraulic excavator are outputted to the display device, whereby the outputs of the actuators are checked. In this case, the detected values of the pressure sensors 121, 122 and the current sensor 19 are outputted to the main controller 30. In addition, display signals for displaying the outputted values are outputted from the main controller 30 to the display device 31.

Figure 8:
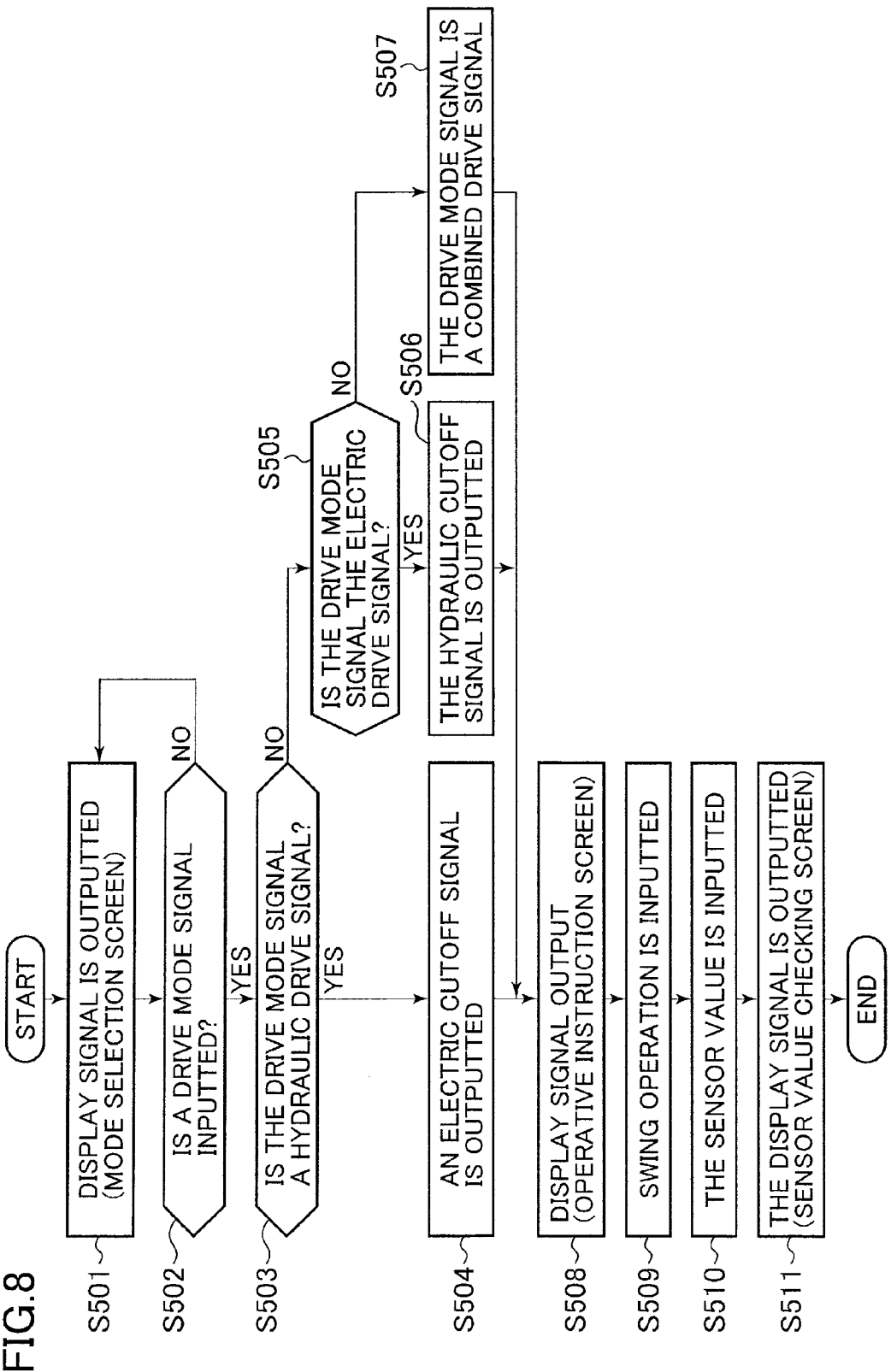
FIG. 8 is a flowchart for output checking processing for a swing electric motor 101 or a swing hydraulic motor 23 according to a second embodiment of the present invention.
Figures 9, 10:
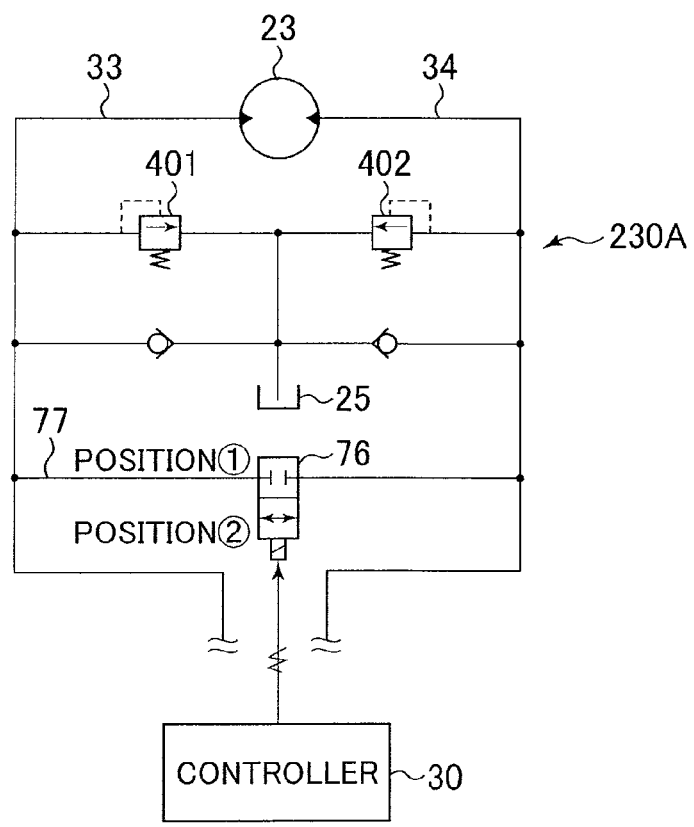
FIG. 9 illustrates a sensor output value checking screen displayed in the display device 31 by way of example.
FIG. 10 is a configurational diagram of a swing hydraulic motor circuit 230A according to a third embodiment of the present invention.

FIG. 8 is a flowchart for output checking processing of the swing electric motor 101 or the swing hydraulic motor 23 according to the second embodiment of the present invention. FIG. 9 shows a sensor output value checking screen displayed on the display device 31 by way of example.

In FIG. 8, the processing from S501 to S509 is the same as that in FIG. 4. If the hydraulic-alone drive mode or the electric-alone drive mode is selected, the operative instruction screen 43 is displayed on the display device 31 (S508) and swing operation is inputted via the operating device 26 (S509). Then, the output values of the pressure sensors 121, 122 and the current sensor 19 are inputted into the main controller 30 (S510). The main controller 30 calculates a differential pressure value from the output values of the pressure sensors 121, 122 and outputs to the display device 31 a display signal for displaying on the screen the differential pressure value and the detected value of the current sensor 19 (S511). In this way, the differential pressure value of the pressure sensors 121, 122 and the current value of the current sensor 19 are displayed on the sensor output value checking screen 44 of the display device 31.

In view of facilitating the determination as to whether or not the differential pressure value and the current value displayed on the checking screen 44 fall within a normal range, it is preferred to display a reference value Cp for the differential pressure value and a reference value Ci for a current value which serve as respective benchmarks for detection of corresponding malfunctions concerning the swing hydraulic motor 23 and the swing electric motor 101. Normal values encountered when the operating device 26 is operated by an operator on the basis of the contents of the operative instruction screen 43 (specifically, here, when the swing lever is operated up to the maximum stroke in the hydraulic-alone drive mode or the electric-alone drive mode) are set as the respective reference values. In addition, the reference values thus set are stored in the storage unit in the main controller 30. Incidentally, the reference values may have a predetermined range. In an example in FIG. 9, a value with a range from Cp1 to Cp2 is set as the reference value for the differential pressure value. In addition, a value with a range from Ci1 to Ci2 is set as the reference value for the current value. If each of the differential pressure value and the current value falls within the range of the corresponding reference value, it can be checked as normal. Alternatively, a difference between the detected value (the differential pressure value and the current value) and the reference value may be displayed as a comparative value therebetween in place of the reference value. In other words, if the relationship between the detected value and the reference value can easily be understood, other display methods may be available. In the above description, the differential pressure value, the current value, the comparative value or the like are displayed. However, calculated torque concerning each of the actuators 23, 101 may be displayed.

Further, in an example in FIG. 9, if the swing hydraulic motor 23 and the swing electric motor 101 are rotated in one direction of the left and right directions, the differential pressure value and the current value each attached with a sign "+" are displayed. Although not shown, if the swing hydraulic motor 23 and the swing electric motor 101 are rotated in the other direction, the differential pressure value and the current value each attached with a sign "−" shall be displayed. If the rotational direction is clearly shown on the checking screen 44 as described above, it can easily be checked whether or not the rotational direction of the swing hydraulic motor 23 and that of the swing electric motor 101 coincide with the operating direction of the operating device 26.

Incidentally, here, the output values (state signals) of the sensors 121, 122, 19 are concurrently displayed regardless of the drive mode. However, only a sensor value necessary for output check in each of the drive modes may be displayed. More specifically, at the time of selection of the hydraulic-alone drive mode or the electric-alone drive mode, it is needed for the display device 31 only to display at least one of the output values of the differential pressure value and the electric current value.

The current sensor 19 for detecting the current value of each of the electric power lines is here described taking as an example as a sensor for detecting the state of the current of the electric power line connected to the electric actuator 101. However, a voltage sensor for detecting line voltage or phase voltage of the electric power line may be installed in addition to or in place of the current sensor 19. In this way, the output value of the voltage sensor may be displayed on the display device 31. In this case, it goes without saying that it is preferred that the reference value Ce for a voltage value be displayed on the display device 31.

In the present embodiment, the detected values of the sensors (the pressure sensors 121, 122 and the three-phase motor current sensor 19) incorporated in the hydraulic excavator are outputted to the display device 31 in order to control the drive of the swing hydraulic motor 23 and the swing electric motor 101. However, devices (e.g. the bourdon tube gauge, the clamp meter and the phase detector) for detecting the state values for checking the outputs of the actuators 23, 101 may additionally be installed and the output values of the detection devices may be outputted to the main controller 30 and displayed on the display device 31.

A description is next given of a third embodiment of the present invention. In the above embodiments, the actuator that has a malfunction is specified by calculating the output torque of the swing hydraulic motor 23 and the swing electric motor 101. However, the hydraulic excavator may be configured as described below. The upper swing structure 2 is swung by the swing hydraulic motor 23 or the swing electric motor 101 in the hydraulic-alone drive mode or the electric-alone drive mode, respectively. In addition, the swing direction, swing velocity, swing acceleration and the like of the upper swing structure 2 are further measured. In this way, the actuator that has a malfunction is specified.

FIG. 10 is a configurational view of a swing hydraulic motor circuit 230A according to the third embodiment of the present invention. The swing hydraulic motor circuit 230A shown in the figure is different from the swing hydraulic motor circuit 230 (see FIG. 2) of the above embodiments in the provision of a solenoid control valve (line communicating means) 76. Incidentally, the other portions are the same as those of the above embodiments except the fact that when the hydraulic-alone drive mode is selected, the main controller 30 outputs a torque-zero signal.

The solenoid control valve 76 is used to switch between the communication and cutoff of the two lines 33, 34 adapted to supply and discharge pressurized fluid to and from the swing hydraulic motor 23. In addition, the solenoid control valve 76 is installed in a line 77 which connects the two lines 33, 34. The solenoid control valve 76 is designed to receive a communication signal from the main controller 30. Upon receipt of the communication signal, the switching position of the solenoid valve 2 is switched from position 1 to position 2 in FIG. 10. In other words, if the electric-alone drive mode is selected, the solenoid control valve 76 is located at position 2, and in the other cases (when the combined drive mode and the hydraulic-alone drive mode are each selected), the solenoid control valve 76 is located at position 1. If, upon receipt of the communication signal, the switching position of the solenoid control valve 76 is switched to position 2, the two lines 33, 34 are made to communicate with each other. In this way, if torque is inputted to the swing hydraulic motor 23 from the swing electric motor 101, the swing hydraulic motor 23 is rotatably driven.

Incidentally, the present embodiment uses the solenoid control valve 76 as communicating means for the two lines 33, 34. If the electric-alone drive mode is selected, the two hydraulic ports 302, 303 may temporarily be connected to each other. Alternatively, it may be configured that one of the relief valves 401, 402 is relieved. If the relief valves 401, 402 are used as in the latter, one of the relief valves 401, 402 located on the downstream side in the flowing direction of the pressurized fluid is relieved. More specifically, if the pressurized fluid flows from the line 33 via the swing hydraulic motor 23 toward the line 34, the relief valve 402 is relived. If the pressurized fluid flows in the opposite direction, the relief valve 401 is relieved. Incidentally, in the case of using the relief valves 401, 402 as described above, if the pressurized fluid is not supplied from the normal direction, the swing hydraulic motor 23 is not rotated. Thus, there is an advantage that it can be checked whether or not the operating direction of the operating device 26 coincides with the rotational direction of the hydraulic motor 23.

Incidentally, the controller 30 according to the present embodiment has a function to output a torque-zero signal to the power controller 55 when the hydraulic-alone drive mode is selected in addition to the function described in the above embodiments. The torque-zero signal is an electric operation signal outputted to control the swing electric motor 101 so that the torque produced by the swing electric motor 101 may become equal to zero. Upon receipt of the torque-zero signal, the power controller 55 controls the swing electric motor 101 so that torque to be produced may become equal to zero. Thus, the upper swing structure 2 is swingably driven only by the torque produced by the swing hydraulic motor 23.

FIG. 11 is a flowchart for processing for checking the output of the swing electric motor 101 or the swing hydraulic motor 23 according to the third embodiment of the present invention. In FIG. 11, the processing from S501 to S509 is the same as that in FIG. 4 and the like; therefore, their explanations are arbitrarily omitted.

If the electric-alone drive mode is selected by an operator through the input device 39 (S505), an electric drive signal is outputted as a drive mode signal to the main controller 30. In this case, the main controller 30 outputs a hydraulic cutoff signal to the solenoid control valves 201, 202 (S506). Further, the main controller 30 outputs a communication signal to the solenoid control valve 76 (S522). In this way, the switching position of the solenoid control valve 76 is switched from position 1 to position 2, so that the two lines 33, 34 are made to communicate with each other via the line 77.

If the operator operates the operating device 26 according to the operative instruction of the operative instruction screen 43 (S508, 509), pilot pressure occurs in the pilot lines 28, 29 according to the operation amount of the operating device 26. In this case, the circuit is disconnected by the solenoid control valves 201, 202; therefore, the control valve 24 is maintained at the neutral position. The power controller 55 drives the swing electric motor 101 on the basis of the electric operating signal inputted from the main controller 30. In this way, the swing electric motor 101 can be driven alone of the two actuators (the swing electric motor 101 and the swing hydraulic motor 23) for driving the upper swing structure 2. Thus, the output of only the swing electric motor 101 can be checked.

In the present embodiment, the two lines 33, 34 connected to the swing hydraulic motor 23 are made to communicate with each other via the line 77. Therefore, torque inputted from the swing electric motor 101 rotates the swing hydraulic motor 23 to swingably drive the upper swing structure 2. In this way, the turning direction, swing velocity and swing acceleration of the upper swing structure 2 can be measured in addition to the measurement of the torque of the swing electric motor 101 described in the above embodiments. One of methods of measuring the swing velocity of the upper swing structure 2 involves operating the swing lever up to the maximum stroke in accordance with the instruction of the operative instruction screen 43 and measuring a time required to turn the upper swing structure 2 a predetermined number of times in the uniform motion state after the lapse of a predetermined time. One of methods of measuring the swing acceleration of the upper swing structure 2 involves measuring a time required to reach one predetermined posture from the other predetermined posture (for example, a time required to swing the upper swing structure 2 at 90 degrees after the swing lever has been operated up to the maximum stroke at once).

In this way, the present embodiment can check the output and function of the swing electric motor 101 also from these views. Incidentally, in the above, the output value of the position sensor 18 may be used to measure the swing velocity and the swing acceleration. In addition, this output value may be displayed on the display device 31. Further, the main controller 30 may calculate the swing velocity and the swing acceleration from the output value and display them on the display device 31. In this case, a reference value acting as a reference for detecting a malfunction may be displayed.

On the other hand, if the hydraulic-alone drive mode is selected by the operator via the input device 39 (S503), the hydraulic drive signal is outputted as the drive mode signal to the main controller 30. In this case, the main controller 55 outputs the torque-zero signal in place of the electric cutoff signal to the power controller 55 (S521). In this way, the power controller 55 controls the swing electric motor 101 so that torque may become equal to zero regardless of the output values of the pressure sensors 105, 106.

If the operator operates the operating device 26 in accordance with the operative instruction of the operative instruction screen 43 (S508, 509), the spool of the control valve 24 is switched by the pilot pressure occurring in the pilot lines 28, 29 in accordance with the operation amount of the operating device 26. In this way, the swing hydraulic motor 23 is driven to produce, in the lines 33, 34, pressure corresponding to the output torque of the swing hydraulic motor 23. Thus, the swing hydraulic motor 23 can be driven alone of the two actuators driving the upper swing structure 2, whereby the output of only the swing hydraulic motor 23 can be checked.

In the present embodiment, the swing electric motor 101 is controlled based on the torque-zero signal; therefore, the upper swing structure 2 can be swingably driven only by the torque produced by the swing hydraulic motor 23. In this way, the turning direction, swing velocity and swing acceleration of the upper swing structure 2 can be measured in addition to the measurement of the torque of the swing hydraulic motor 23 described in the above embodiments. One of the methods of measuring the swing velocity of the upper swing structure 2 is the method described earlier. Thus, the present embodiment can check the output and function of the swing hydraulic motor 23 also from these views. Incidentally, in the above description, the output value of the position sensor 18 may be used to measure the swing velocity and the swing acceleration. Alternatively, the swing velocity and the swing acceleration may be calculated from the output value and may be displayed.

Accordingly, the present embodiment can check the output and function of the swing electric motor 101 and the swing hydraulic motor 23 also from a viewpoint of the swing velocity and swing acceleration of the upper swing structure 2.

Incidentally, the above embodiments describe the case where while using the monitor as the display device 31 installed in the cabin of the hydraulic excavator, the input device 39 installed also in the cabin is used. However, an information terminal (e.g., a handheld terminal (Personal Digital Assistant), a laptop personal computer or the like) having the same display function and input function as the above may be connected to the main controller 30 via the connection terminal 301 (see FIG. 2) and input and display may be done through the information terminal.

In the above, the description is given on the assumption that after the electric power (electric energy) generated by the assisting power-generating motor 102 is once stored in the capacitor 104, it is supplied to the swing electric motor (the electric actuator) 101. However, the swing electric motor 101 may directly be driven on the electric power generated by the assisting power-generating motor 102. That is to say, not only the electric storage devices including the capacitor 104 but also various electrical supply devices including the assisting power-generating motor 102 can be used as means for supplying electric power to the electric actuator.

DESCRIPTION OF REFERENCE NUMERALS

18 Position sensor
19 Current sensor
21 Engine
22 Hydraulic pump
23 Swing hydraulic motor
24 Control valve (directional control valve)
26 Operating device
27 Pilot valve hydraulic source
28, 29 Pilot lines
30 Main controller
31 Display device (monitor)
32, 33, 34 lines
38 Measuring part
39 Input device
55 Power controller
76 Solenoid control valve
101 Swing electric motor
102 Assisting power-generating motor
103 Power control unit
104 Capacitor (electric power supply device)
105, 106 Pressure sensors (pilot pressure detecting means)
121, 122 Pressure sensors (swing drive pressure detecting means)
131 Engine rotating velocity sensor
201, 202 Solenoid valves
301, 305 External connection terminals
302, 303 Hydraulic ports (pressure detection ports)
401, 402 Relief valves

The invention claimed is:

1. A work machine comprising:
two or more actuators to drive a common drive object, the actuators including at least one hydraulic actuator and one electric actuator;
a hydraulic pump for to supply pressurized fluid to the hydraulic actuator;
an electric power supply device to supply electricity to the electric actuator;
an operating device having a control lever to output, through a single operation via the control lever, an operating signal for concurrently operating the hydraulic actuator and the electric actuator;
a controller configured to switch between a plurality of drive modes including a hydraulic-alone drive mode and an electric-alone drive mode, wherein the hydraulic-alone drive mode drives only the hydraulic actuator among the two or more actuators to thereby drive the drive object when the operating device is operated, and the electric-alone drive mode drives only the electric actuator among the two or more actuators to thereby drive the drive object when the operating device is operated; and
an input device used by an operator to select, at the operator's request, any one of the plurality of drive modes including the hydraulic-alone drive mode and the electric-alone drive mode,
wherein, when one of the hydraulic-alone drive mode or the electric-alone drive mode is selected with the input device, the controller is further configured to switch the drive mode of the drive object in accordance with the drive mode thus selected.

2. The work machine according to claim 1, further comprising:
a pair of hydraulic ports installed in a line for supplying pressurized fluid to the hydraulic actuator and a line for discharging pressurized fluid from the hydraulic actuator, respectively; and
a measurement part for attaching thereto a measuring device for measuring at least one of a value and a phase of an electrical current flowing in an electric power line connected to the electric actuator and a value of voltage of the electrical power line.

3. The work machine according to claim 2, further comprising:
a pressure measuring device mounted to the pair of hydraulic ports, the pressure measuring device outputting pressures before and behind the hydraulic actuator; and
an electric measuring device mounted to the measurement part, the electric measuring device outputting the current value of the electric power line connected to the electric actuator.

4. The work machine according to claim 1, further comprising:
a plurality of first sensors to detect pressures before and behind the hydraulic actuator;
a second sensor to detect a state of the electric current of an electric power line connected to the electric actuator,
wherein the controller is further configured to output values from at least one of the first sensors and the second sensor when the hydraulic-alone drive mode or the electric-alone drive mode is selected with the input device.

5. The work machine according to claim 1, further comprising:
a control valve to communicate a line for supplying pressurized fluid to the hydraulic actuator with a line for discharging pressurized fluid from the hydraulic actuator, when the electric-alone drive mode is selected with the input device,
wherein the controller is further configured to output a torque-zero signal as an operating signal for the electric actuator when the hydraulic-alone drive mode is selected with the input device.

6. The work machine according to claim 5, further comprising:
a sensor to detect a displacement of the hydraulic actuator or the electric actuator,
wherein the controller is further configured to output a value of the sensor when the hydraulic-alone drive mode or the electric-alone drive mode is selected with the input device.

7. The work machine according to claim 1, further comprising:
a plurality of sensors to output signals representing various states of the hydraulic actuator and the electric actuator;
a storage unit having stored therein reference values of the signals of the various states each serving as a reference for detecting the malfunction of the hydraulic actuator and the electric actuator, the reference values being values of the signals of the various states encountered when a predetermined operation is performed through the operating device in the case where the hydraulic-alone drive mode or the electric-alone drive mode is selected; and
a connection terminal for connection with display means for displaying a screen on the basis of a display signal outputted from the controller;
wherein, when the hydraulic-alone drive mode or the electric-alone drive mode is selected, the controller is further configured to output to the connection terminal a first display signal for requesting the predetermined operation of an operator via the operating device, and output to the connection terminal a second display signal for displaying the relations between the reference values and the output signals of the sensors encountered when the operating device is operated based on the first display signal.

8. A work machine comprising:
two or more actuators to drive a common drive object, the actuators including at least one hydraulic actuator and one electric actuator;
a hydraulic pump to supply pressurized fluid to the hydraulic actuator;
an electric power supply device to supply electricity to the electric actuator;
an operating device having a control lever to output, through a single operation via the control lever, an operating signal for concurrently operating the hydraulic actuator and the electric actuator;
a controller configured to switch between a plurality of drive modes including a combined drive mode and an electric-alone drive mode, where the combined drive mode drives the two or more actuators to thereby drive the drive object when the operating device is operated, and the electric-alone drive mode drives only the electric actuator among the two or more actuators to thereby drive the drive object when the operating device is operated; and
an input device used by an operator to select, at the operator's request, any one of the plurality of drive modes including the combined drive mode and the electric-alone drive mode,
wherein, when one of the combined drive mode or the electric-alone drive mode is selected with the input device, the controller is further configured to switch the drive mode of the drive object in accordance with the drive mode thus selected.

9. A work machine comprising:
two or more actuators to drive a common drive object, the actuators including at least one hydraulic actuator and one electric actuator;
a hydraulic pump to supply pressurized fluid to the hydraulic actuator;
an electric power supply device to supply electricity to the electric actuator;
an operating device having a control lever to output, through a single operation via the control lever, an operating signal for concurrently operating the hydraulic actuator and the electric actuator; and
a controller configured to switch between a plurality of drive modes including a combined drive mode and a hydraulic-alone drive mode, wherein the combined drive mode drives the two or more actuators to thereby drive the drive object when the operating device is operated, and the hydraulic-alone drive mode drives only the hydraulic actuator among the two or more actuators to thereby drive the drive object when the operating device is operated; and
an input device used by an operator to select, at the operator's request, any one of the plurality of drive modes including the combined drive mode and the hydraulic-alone drive mode;
wherein, when one of the combined drive mode or the hydraulic-alone drive mode is selected with the input device, the controller is further configured to switch the drive mode of the drive object in accordance with the drive mode thus selected.

* * * * *